(12) United States Patent
Collier

(10) Patent No.: US 11,580,064 B2
(45) Date of Patent: Feb. 14, 2023

(54) METHODS AND SYSTEMS FOR ENCODING URI FOR ARBITRARY PAYLOAD DATA BASED ON ALPHANUMERIC ENCODING METHODS

(71) Applicant: CYPHERPUNK LLC, Pueblo, CO (US)

(72) Inventor: Zachary Collier, Pueblo, CO (US)

(73) Assignee: Cypherpunk LLC, Pueblo, CO (US)

( * ) Notice: Subject to any disclaimer, the term of this patent is extended or adjusted under 35 U.S.C. 154(b) by 0 days.

(21) Appl. No.: 17/355,128

(22) Filed: Jun. 22, 2021

(65) Prior Publication Data
US 2022/0414055 A1    Dec. 29, 2022

(51) Int. Cl.
| | | |
|---|---|---|
| *H04L 5/00* | (2006.01) | |
| *G06F 16/11* | (2019.01) | |
| *G06F 16/955* | (2019.01) | |

(52) U.S. Cl.
CPC ........ *G06F 16/116* (2019.01); *G06F 16/9554* (2019.01); *H04L 5/0044* (2013.01)

(58) Field of Classification Search
None
See application file for complete search history.

(56) References Cited

U.S. PATENT DOCUMENTS

| | | | |
|---|---|---|---|
| 6,751,352 B1 | 6/2004 | Baharav | |
| 7,639,687 B1 | 12/2009 | Tsai | |
| 8,047,447 B2 | 11/2011 | Bulan et al. | |
| 8,363,830 B2 | 1/2013 | Michaels | |
| 8,566,601 B1 | 10/2013 | Waters | |
| 9,832,471 B2 | 11/2017 | Ahrweiler | |
| 9,843,596 B1* | 12/2017 | Averbuch | G06F 21/554 |
| 9,864,892 B2 | 1/2018 | Vasic | |
| 2009/0089078 A1* | 4/2009 | Bursey | H04W 4/70 |
| | | | 705/300 |
| 2010/0278445 A1 | 11/2010 | Kindberg | |
| 2011/0295990 A1 | 5/2011 | St. Jean | |
| 2016/0020782 A1* | 1/2016 | Ruff | H03M 7/30 |
| | | | 341/95 |
| 2018/0356560 A1* | 12/2018 | Averbuch | G01W 1/10 |
| 2020/0026599 A1 | 1/2020 | Chen | |

FOREIGN PATENT DOCUMENTS

WO    2005091547    9/2005

* cited by examiner

*Primary Examiner* — Tuankhanh D Phan
(74) *Attorney, Agent, or Firm* — Kanika Radhakrishnan; Evergreen Valley Law Group

(57) ABSTRACT

Computer-implemented methods and systems for efficient alphanumeric encoding for arbitrary payload data are disclosed. The computer-implemented method, performed by a server system, includes accessing URI-oriented payload data. The method further includes converting the URI-oriented payload data into an alphanumeric data type based, at least in part, on an alphanumeric encoding method. The alphanumeric encoding method may be one of BASE36, BASE37, BASE38-QR-URI-UNRESERVED, BASE42, BASE45, Base64, Base66, Base183, and Base191. The method further includes generating a machine-readable code based, at least in part, on the converted URI-oriented payload data.

20 Claims, 9 Drawing Sheets

METHODS AND SYSTEMS FOR ENCODING URI FOR ARBITRARY PAYLOAD DATA BASED ON ALPHANUMERIC ENCODING METHODS

TECHNICAL FIELD

The present disclosure relates to the data encoding and decoding technology and, more particularly to, electronic methods and complex processing systems for encoding URI for arbitrary payload data based on alphanumeric encoding methods.

BACKGROUND

Currently, inefficient encoding techniques for various barcode-URI creation have been adopted by the industry. These techniques use various character encodings with varying levels of interoperability due to which most systems use inefficient encodings. The industry has many encoding techniques for strings, especially those used in 1D or 2D barcode encoding. For example, an existing serial number may be decimal, hexadecimal, or base 32 and be represented as text or a barcode. Any industry number, serial, or other encoded string can be treated as a number and converted into another radix, alphabet, or both. However, existing industry conversion systems use varying encoding methods. RFC 4648 base32 is one such system that uses a different encoding method, what is termed as a "bucket" method when compared to the standard RFC 4648 base16, which is compatible with an iterative divide by radix approach.

Base conversion, or number system conversion is used to convert a given number in a given base to another number in another given base. For example, the base 2 (binary) string "11111111111111111" is "131,071" in base 10 (decimal), "1FFFF" in base 16 (hexadecimal), or "fxr" in base 58 (e.g., an encoding used by Bitcoin). For each increase in the size of the base, the resulting string size is smaller. The relation that larger bases tend to result in small strings is a key feature in the field of encoding.

If readability, size, aesthetics, error correction, and efficiency are potential concerns, the encoding must be considered. To keep QR codes maximally readable, the most efficient encoding for an application should be used. By efficiently encoding data, QR codes use less physical space and are more readable by machinery and end-users. One might assume that encoding is irrelevant for small strings. However, efficient encoding allows even small strings to employ better error correction without increasing the QR version.

In light of the above discussion, there is a need for technical solutions for efficiently encoding URIs using customized alphanumeric encoding methods.

SUMMARY

Various embodiments of the present disclosure provide methods and systems for efficient alphanumeric encoding of URIs.

In one embodiment, a computer-implemented method is disclosed. The computer-implemented method performed by the server system includes accessing URI-oriented payload data. The method includes converting the URI-oriented payload data into an alphanumeric data type based, at least in part, on an alphanumeric encoding method. The method further includes generating a machine-readable code based, at least in part, on the converted URI-oriented payload data.

In yet another embodiment, a server system is disclosed. The server system includes a memory configured to store instructions, a communication interface, a processor in communication with the memory and the communication interface, and the processor is configured to execute the instructions stored in the memory and thereby cause the server system to access URI-oriented payload data. The server system is further caused to convert the URI-oriented payload data into an alphanumeric data type based, at least in part, on an alphanumeric encoding method. The server system is caused to generate a machine-readable code based, at least in part, on the converted URI-oriented payload data.

In yet another embodiment, a computer-implemented method for efficient alphanumeric encoding for URIs is disclosed. The computer-implemented method performed by a server system includes accessing URI-oriented payload data. The computer-implemented method includes converting the URI-oriented payload data into an alphanumeric data type based, at least in part, on an alphanumeric encoding method. The alphanumeric encoding method may be one of: BASE36, BASE37, BASE38-QR-URI-UNRESERVED, BASE42, BASE45, Base64, Base66, Base183, and Base191. The computer-implemented method includes generating, by the server system, a machine-readable code based, at least in part, on the converted URI-oriented payload data.

BRIEF DESCRIPTION OF THE FIGURES

For a more complete understanding of example embodiments of the present technology, reference is now made to the following descriptions taken in connection with the accompanying drawings in which.

Figure 1:
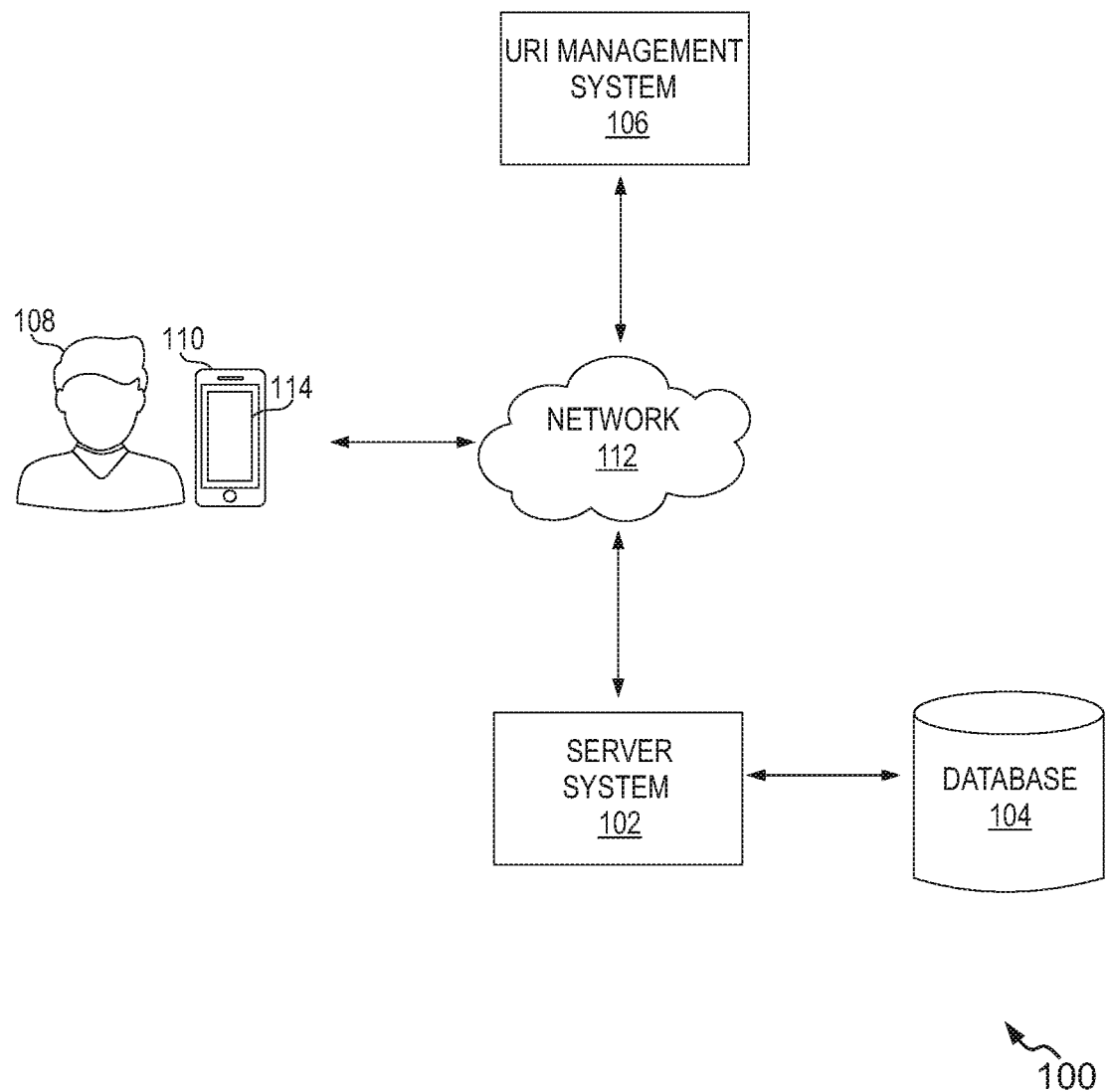
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The term "URI" or "Uniform Resource Identifier" herein refers to a string of characters that unambiguously identifies a particular resource, where each URI defines corresponding values, although the numbers assigned to each value in a particular may vary from one text to the next text, as they relate to different entities or the entities to which they relate evolve. To guarantee uniformity, all URIs follow a pre-defined set of syntax rules. As such, these URIs may constitute, or reflect, a digital twin of an entity. Some examples of values include identity, date, period of time, 2D coordinates, areas, 3D coordinates, volumes, and so on. Some of these possibilities and possible combinations thereof are explored in the following examples.

Further, the RFC 3986, referred herein, is the de facto standard for URIs and it defines unreserved characters that may be used without restriction in URIs. The unreserved characters are intended to not carry special meaning to the browser or other systems that handle URIs. According to the RFC 3986, The URI may include a root value (i.e., authority), a domain of the path, prefix, and like. In accordance with the generic URI syntax, a URI complies with the following format:

URI=scheme: scheme:[//authority]path[?query][#fragment]

Accordingly, a root element of the URI defines the authority, the domain part of the path of the resource. The skilled person will appreciate that depending on implementation details any string may be used as appropriate. Where the root includes a prefix, for example after a domain component, this may indicate additional processing steps, or be used as an indication of the semantic content of the URI, or of the identity of the data structure used in its encoding.

The term "base X" (i.e., a space between the term "base" and "X") refers to alphanumeric encoding methods that are not defined in any defined standards. For example, base 37 refers to a radix with 37 character sets. Conversely, the term "baseX", without a space, refers to pre-defined standards.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

OVERVIEW 2D codes such as QR codes are widely deployed to represent URIs. QR codes have a few major encoding modes, namely, numeric encoding, alphanumeric encoding, and byte encoding. The numeric encoding consists of 10 total characters and 10 bits per 3 digits/characters. The alphanumeric encoding consists of 45 total characters and 11 bits per 2 characters, and the byte (or binary) encoding consists of 191 total characters and 8 bits per character.

Alphanumeric encoding limits the strings to uppercase alpha characters, numeric characters, and a few special characters. Alphanumeric encoding can transmit URIs efficiently and it appears ideal for URIs as URI domains are case insensitive. The portion of the URI that follows the domain and the URI path is potentially case-sensitive. If a website's path, which is in the control of the website operator, is not already case insensitive, a new URI path for case insensitive QR code use can easily be employed. For this reason, character casing is mostly a waste of bits since it is not relevant to the website address.

QR alphanumeric encoding consists of 45 alphanumeric characters that are as follows: 0-9,A-Z (upper-case only), space, $, %, *, +, −, ., /, :.

These 45 alphanumeric characters have a bit encoding space of 2025 bits. Alphanumeric measures characters in doublets where 11 bits represent two characters. The total character space for a doublet is the space of one character times the space of the second, i.e., 45*45=2025. 2025 represents the total character space of a doublet. The perfect character space for 11 bits is 2048 ($2^{11}$=2048). This means the QR code's alphanumeric encoding is approximately 99% efficient. It is known for a fact that any encoding scheme that uses 45 characters will be 100% efficient in the alphanumeric encoding space.

The encoding methods present in the industry are provided in the table below shown in Table 2:

TABLE 1

| Encoding Method | Length | Characters |
| --- | --- | --- |
| URI Unreserved (uri-unreserved or unreserved) | 66 | ABCDEFGHIJKLMNOPQRSTUVWXYZabcdefghijkl mnopqrstuvwxyz0123456789-_.~ |
| URI Reserved (uri-reserved or reserved) | 18 | :/?#[ ]@!$&'( )*+,;= |
| Numeric | 10 | 0123456789 |
| QR Alphanumeric | 45 | 0123456789ABCDEFGHIJKLMNOPQRSTUVWXYZ $%*+−./: |

TABLE 1-continued

| Encoding Method | Length | Characters |
|---|---|---|
| QR Byte Printable (printable) | 188 | !"#$%&'()*+,-./0123456789:;<=>?@ABCDEFGHIJKLMNOPQRSTUVWXYZ[\]^_`abcdefghijklmnopqrstuvwxyz{\|}~¡ ¢£¤¥¦§ ¨ ©ª«¬ ®¯°±²³´µ¶¦¹º»¼½¾¿ÀÁ ÂÃÄÅÆÇÈÉÊËÌÍÎÏÐÑÒÓÔÕÖ×ØÙÚÛÜÝÞ ßàáâãäåæçè éêëìíîïðñòóôõö÷øùúûüýþ ÿ |
| Alpha | 52 | ABCDEFGHIJKLMNOPQRSTUVWXYZabcdefghijklmnopqrstuvwxyz |
| Alphanumeric | 62 | 0123456789ABCDEFGHIJKLMNOPQRSTUVWXYZabcdefghijklmnopqrstuvwxyz |
| US-ASCII | 128 | (See https://en.wikipedia.org/wiki/ASCII) |
| Extended ASCII | 256 | (See https://en.wikipedia.org/wiki/Extended_ASCII) |

Unreserved characters are intended to not carry any special meaning to the browser or other systems that handle URIs. Reserved characters may carry special meaning to various URI schemes. Other characters outside of reserved and unreserved sets must be treated with special care, such as using the percent-encoding method. The 66 unreserved characters for URIs are the following:
ABCDEFGHIJKLMNOPQRSTUVWXYZabcdefghijklm-nopqrstuvwxyz0123456789-_.~

The 18 URI reserved characters are the following:
:/?#[]@!$&'()*+,;=

There are many barcodes employed in the industry such as quick response ("QR") code, Data Matrix, MaxiCode, PDF 417, Aztec Code, and Code 128. In this disclosure Methods useful for URI-oriented barcodes and binary transport are defined. Examples will focus mainly on QR code, but it should be noted that the methods are constructed while considering general compatibility and barcode encoding.

The QR code standard defines a set of barcode sizes named 'versions' composed of pixels. The QR code versions are defined in relation to string character length, error correction, and string encoding. There are versions 1 through 40. Version 1 is defined as a 21 by 21 pixel square and version 40, the maximum size, is defined as a 177 by 177 pixel square. Every increment in version size results in a QR code that is 4 pixels wider and higher. For example, version 1 is 21 by 21 pixels and version 2 is 25 by 25 pixels. The term 'pixel' may be referred to as a "dot" or "module" interchangeably.

Various embodiments of the present disclosure provide methods, systems electronic devices, and computer program products for efficiently encoding URIs using alphanumeric encoding methods. QR-URI or barcode-URI is a defined suite of character sets using any encoding method. The QR-URIs or the Barcode-URIs suites are designed for interoperability between barcode and URI systems. The methods provided in this disclosure facilitate the intersection of two character sets of an alphanumeric encoding method so that the resulting encoding is more compatible for two or more target systems. The methods also efficiently encode arbitrary payloads. The present disclosure provides techniques and methodology for generating efficient machine-readable codes using an alphanumeric encoding method. A number can be represented in many number bases (radixes). Base conversion, or number system conversion, is used to convert a given number in a given base to another number in another given base. Base conversion is important for encoding since it allows information to be efficiently encoded into a given alphabet of a given number base. The present disclosure provides an iterative divide by radix approach for converting numbers into integers. There are many barcodes employed in the art such as quick response ("QR") code, Data Matrix, MaxiCode, PDF 417, Aztec Code, and Code 128. A URI is a string of characters that unambiguously identifies a particular resource. To guarantee uniformity, all URIs follow a predefined set of syntax rules.

In an example, the present disclosure describes a server system that is configured to access URI-oriented payload data from a user device. The URI-oriented payload data may include text data associated with the product. Such data may have to be encoded in the QR code of the product to scan and determine the information associated with the product. The URI-oriented payload data may include text data used to uniquely identify a product or a website which will be encoded in the barcode-URI.

The server system is further configured to convert the URI-oriented payload data into an alphanumeric data type based on an alphanumeric encoding method from a plurality of alphanumeric encoding methods. The plurality of alphanumeric encoding methods may include BASE36, BASE37, BASE38-QR-URI-UNRESERVED, BASE42, BASE45, Base64, Base66, Base183, and Base191. These custom alphanumeric encoding methods are novel and tailored for improved compatibility and efficiency of the barcode-URIs. Alphanumeric encoding techniques are disclosed herein because alphanumeric encoding constrains strings to uppercase alphabet characters, numeric characters, and a few special characters. Alphanumeric encoding can transmit URIs efficiently and appears ideal for URIs as domains are case insensitive.

Once the URI-oriented payload data is converted, the server system is configured to generate a machine-readable code based on the converted URI-oriented payload data. The server system may utilize a URI management system for the generation of machine-readable code. The URI management system is configured to generate a machine readable code such as a QR-URI, or a barcode-URI. The machine-readable code may be scanned by any user device installed with an application provided by the server system. Once scanned, the server system may facilitate the user device to interpret the payload data encoded in the QR-URI scanned by the user device.

Without in any way limiting the scope, interpretation, or application of the claims appearing below, technical effects of one or more of the example embodiments disclosed herein include, but are not limited to, efficiently generating QR-URIs by utilizing custom alphanumeric encoding methods. The present disclosure defines efficient intersections between barcode encoding and URI encoding. The present disclosure provides methods to encode QR-URIs including larger bits in lesser characters. This enables the QR-URIs to be smaller and also include more data. Therefore, the space needed to print the QR-URIs is reduced, and with higher information, the information stored in the QR-URIs is also increased. Further, the present disclosure also provides methods to perform truncation and extension of the character sets of the encoding methods. The truncation process allows higher compatibility and the extension process enables higher efficiency.

Various example embodiments of the present disclosure are described hereinafter with reference to FIGS. 1 to 9.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, encoding barcode-URI for arbitrary payload data using novel encoding techniques for better compatibility and efficiency, etc. The environment 100 generally includes a server system 102, a database 104, an URI management system 106, a user 108 associated with a user device 110, associated with and in communication with (and/or with access to) a network 112. The network 112 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 112 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. The network 112 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 112 may include multiple different networks, such as a private network made accessible by the server system 102, the database 104, the URI management system 106, and the user device 110 separately, and/or a public network (e.g., the Internet) through which the server system 102, the database 104, the URI management system 106, and the user device 110 may communicate. In some embodiments, the database 104, the URI management system 106, and the user device 110 may, for example, be connected to the server system 102 via various wireless means such as, cell towers, routers, repeaters, ports, switches, and/or other network components that include the Internet and/or a cellular telephone (and/or Public Switched Telephone Network (PSTN)) network, and which include portions of the network 112.

The database 104 may store a plurality of alphanumeric encoding methods utilized by the server system 102 and/or the URI management system 106, for example, to encode the barcode-URI for arbitrary payload data.

In one embodiment, the user device 110 may include any type or configuration of computing, mobile electronic, network, user, and/or communication devices that are or become known or practicable. Examples of the user device 110 include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like. Each user device may include an ultrasound sensor, a global position satellite transceiver, WiFi transceiver, mobile telephone components, and/or any suitable combination thereof. In some embodiments, the user device 110 may store program code for a web browser application as well as one or more program routines for respectively handling machine scanning operations (including scanning, decoding, and interpreting machine-scannable codes), and non-web-browser URI handling operations.

According to some embodiments, the user device 110 may communicate with the server system 102 via the network 112, such as to scan a barcode-URI or QR code generated by the server system 102 and/or the URI management system 106, etc.

In one embodiment, the user device 110 is equipped with a mobile application 114. The mobile application 114 enables users to log in and scan a barcode-URI generated by the server system 102. The mobile application 114 is configured to interpret the payload data in the scanned barcode-URI. The user device 110 may be any communication device having hardware components for enabling User Interfaces (UIs) of the mobile application 114 to be presented on the user device 110. In one example embodiment, a website application may be utilized on the user device (e.g., user device 110) to interpret the payload data in the barcode-URI.

In one embodiment, the user 108 may input an actionable data payload for exposure, via a machine scannable code to at least one user device from a number of user devices (i.e., systems) of different user device types. The actionable payload should invoke a non-web-browser application on the differing mobile device types, and the differing mobile device types require differing URI formats to invoke the intended non-web-browser application.

In one non-limiting example, the actionable data payload may include information such as contact information (for invoking address book or contact manager applications on the differing mobile device types), geo-location information (for invoking geo-mapping applications on the differing mobile device types), event information (for invoking calendar or appointment applications on the differing mobile device types), downloadable content information (for invoking store or e-commerce applications on the differing mobile device types), and the like.

The user device 110 sends an actionable data payload to the server system 102, which generates barcode-URI including a unique URL associated with the data payload. The server system 102 may store the data payload and the unique URL into the database 104. In one embodiment, the server system 102 may encode the data payload into a machine scannable code and send the encoded data payload to the user 108. For example, in one embodiment, the server system 102 may encode the unique URL into a two-dimensional barcode or QR code and send an image of the barcode or the QR code to the user 108. In other embodiments, the server system 102 may send the unencoded unique URL directly to the user 108, in addition to or instead of the machine-scannable code.

The server system 102 is configured to encode the data payload into the URI such that the user device 110 will be able to interpret and act on the data payload by invoking a non-web-browser application. In one embodiment, the server system 102 is configured to convert the URI-oriented payload data into an alphanumeric data type based on alphanumeric encoding methods selected based upon user's requirements. The alphanumeric encoding methods may be one of the encoding methods defined in the description such as BASE36, BASE37, BASE38-QR-URI-UNRESERVED, BASE42, BASE45, Base64, Base66, Base183, and Base191. In one embodiment, the alphanumeric encoding method is selected based upon characteristics of the alphanumeric encoding method. The characteristics may include printable character set, URI unreserved, URI safe, binary transport, efficient URI payload, QR-URI, QR bit space efficiency, encoding type, etc.

The above alphanumeric encoding methods are also generally compatible with URI "queries" and "fragments", however they are not designed or broadly compatible with URI "authority" or "scheme". The present disclosure uses the phrase "path" inclusive of URI components that are path-like such as queries and fragments and will not further differentiate path, query and fragment.

The URI-oriented payload data may be accessed from a database associated with a client side server (not shown in the figure). The server system 102 is further configured to convert the URI-oriented payload data into an alphanumeric data type, based on an alphanumeric encoding method. The data structures required for the alphanumeric encoding using the alphanumeric encoding methods may be stored in the database 104.

The plurality of alphanumeric encoding methods for URIs will be explained in detail in FIG. 2. Once the URI-oriented payload data is converted into an alphanumeric data type using one of the alphanumeric encoding methods, the server system 102 is configured to generate a machine-readable code based on the converted URI-oriented payload data. The server system 102 may utilize the URI management system 106 for the generation of machine-readable code in one example embodiment. In another embodiment, the server system 102 itself may be capable of generating the machine-readable code using the converted URI-oriented payload data expressed in terms of the alphanumeric data type.

In one embodiment, the URI management system 106 is configured to utilize methods existing in the arts to generate machine-readable code such as QR code based on the converted URI-oriented payload data. The QR code may be scanned to directly by a user device such as the user device 110. In another example, the converted URI payload data may be inserted into a URL and the URL may be converted into a machine-readable code.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
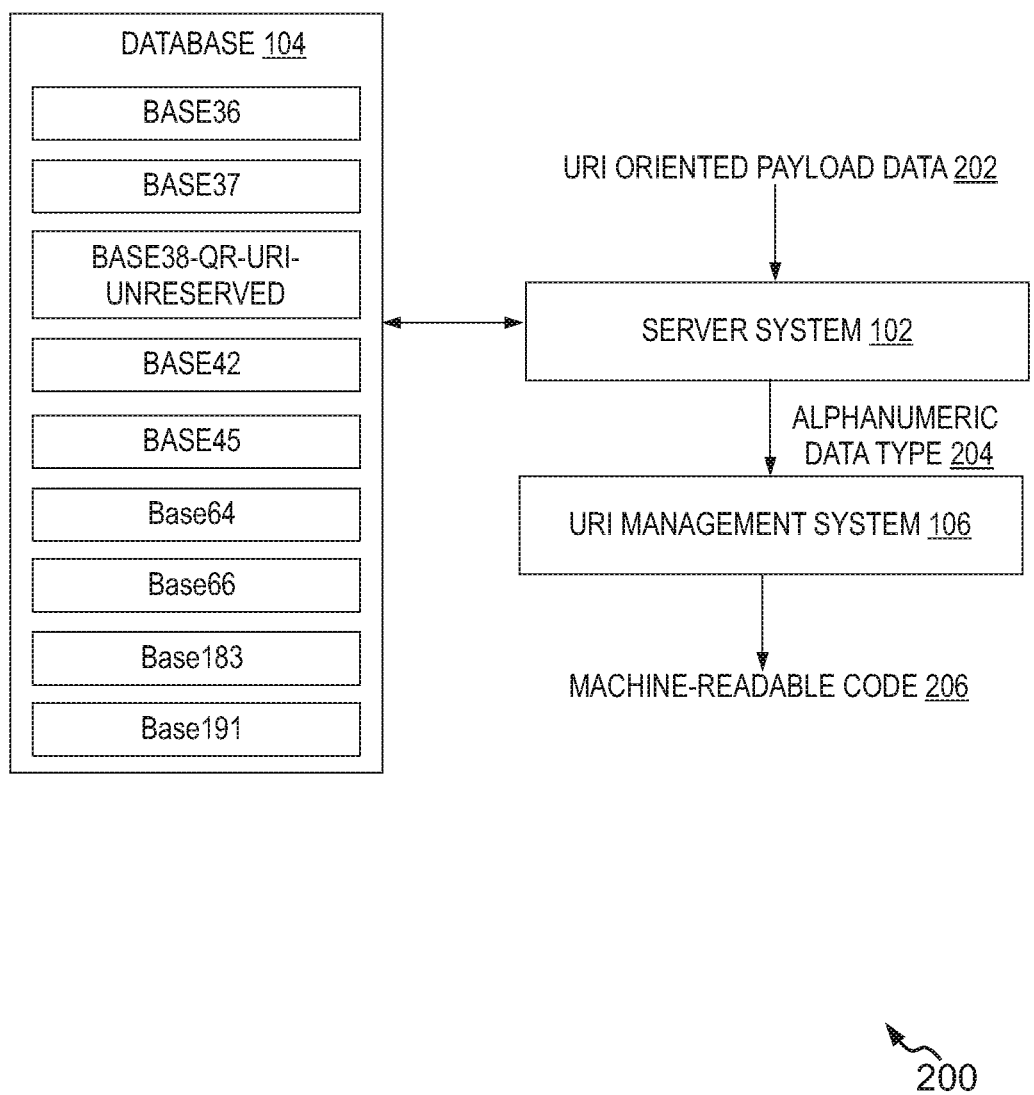
FIG. 2 is a schematic block diagram representation for encoding arbitrary size payload data using a plurality of alphanumeric encoding methods, in accordance with an embodiment of the present disclosure.

FIG. 2 is a schematic block diagram representation 200 for encoding arbitrary size payload data using a plurality of alphanumeric encoding methods, in accordance with an embodiment of the present disclosure. The server system 102 implements a plurality of alphanumeric encoding methods. The plurality of alphanumeric encoding methods constrains strings to uppercase alpha characters, numeric characters, and a few special characters. The plurality of alphanumeric encoding methods can transmit URIs efficiently and appears ideal for URIs as domains are case insensitive. The portion of the URI that follows the domain, the URI path, is potentially case sensitive. If a website's path, which is in the control of the website operator, is not already case insensitive, a new URI path for case insensitive QR use can easily be employed. For this reason, character casing is mostly a waste of bits since it is not relevant to the website address.

The plurality of alphanumeric encoding methods may include, but are not limited to, BASE36, BASE37, BASE38-QR-URI-RESERVED, BASE42, BASE45, Base64, Base66, Base183, and Base191. The data structures of the plurality of alphanumeric encoding methods are stored in the database 104.

As discussed earlier, the server system 102 is configured to access the URI-oriented payload data (see, 202) from the user device 110. The URI-oriented payload data may include text data associated with a product or a website that needs to be encoded in a machine-readable code such as the barcode-URI or a QR code. The URI-oriented payload data may be processed by the server system 102 to convert the URI-oriented payload data into an alphanumeric data type (see, 204). Thereafter, the URI management system 106 is configured to generate a machine-readable code based at least in part on the alphanumeric data type corresponding to the URI-oriented payload data. In particular, the URI management system 106 is configured to transform binary information into the machine-readable graphics format.

In some embodiments, alphanumeric encoding methods may be used for generating the barcode-URIs or byte encoding methods may be used in some other embodiments. In an additional embodiment, QR codes and other barcodes support mixed mode which allows multiple encodings in a single barcode. Since QR alphanumeric encoding is generally more efficient, it is possible to have a portion of a string byte encoded and another portion, such as payload data, encoded in the more efficient alphanumeric encoding. There is slight overhead in mode switching but since byte encoding is very inefficient, it is quickly advantageous to use mixed encoding with sufficiently long payloads. If the difference between not using mixed mode and using mixed mode results in fewer bits, mixed mode may be used.

In one embodiment, the server system 102 is configured to define data structures of the alphanumeric encoding methods. The data structures of the alphanumeric encoding methods may be shared between the encoding side and the decoding side, for example by means of a transmission from one to the other, or via occasional or on-demand access to a common storage resource or otherwise. Alternatively, the data structures may be defined independently on both sides, for example on the basis of user input, machine learning, and the like as discussed above. Each data structure may define a possible character set used for an alphanumeric encoding method. The character set may include a plurality of characters.

BASE36: The server system 102 is configured to utilize the BASE36 encoding scheme for encoding URI-oriented payload data. In general, the URI-oriented Base 36 encoding method is a widely used encoding method in the present in the art with an undefined encoding method. However, the present disclosure defines the following as "BASE36" using the iterative divide by radix conversion method.

The character set for the BASE36 encoding method is as follows:
0123456789ABCDEFGHIJKLMNOPQRSTUVWXYZ The BASE36 encoding method may also be referred to as "base36-qr-uri" and "base36-qr-uri-unreserved". The BASE36 character set is a truncation of the BASE45 character set. During truncation, alphabets are ordered to enable users to create custom alphabet for their applications. Since more problematic characters appear later in the alphabet set, in most anticipated cases, the truncation process should result in alphabet with progressively more acceptable encoding. Since problematic characters are later and acceptable characters are earlier in the alphanumeric encoding method, the progressive truncation results in alphabet with higher compatibility. Since the BASE36 encoding method is a truncation of Base66, it may also be aliased as "base36-uri".

BASE37: The character set for the BASE37 alphanumeric encoding method is defined as the following:
0123456789ABCDEFGHIJKLMNOPQRSTUVWXYZ- The "-" character is the only special character with no special meaning in URI schemes and the only usable non-alphabetical or numerical character for all URI situations. This decreases the base 45 character set down to base 37 for the purpose of arbitrary payload encoding in URIs.

It will be appreciated that the BASE37 encoding method allows for 1369 possibilities per character doublet (i.e., 37*37=1369). The possibilities per character doublet (i.e., 1369) over the potential of 2,025 represent a rounded 68% efficiency in the character space and 67% efficiency in the bit space (1369/2048). The minimum bits required for a character doublet with 1369 combinations is 11 bits as the maximum character space for the previous power of two, $2^{10}$ is only 1,024.

The valid URIs additionally needs the special characters "/", ":", and ".". Although these special characters are not included in the BASE37 character set, these three additional special characters are required to construct a valid URI. The inclusion of these special characters increases the URI alphabet to base 40 (40*40=1,600) or 79% efficiency of the available alphanumeric encoding scheme. The BASE37 character set follows the tradition of hexadecimal encoding with numeric characters appearing first. This particular alphabet scheme is to be known as "BASE37". The BASE37 alphanumeric encoding method may also be termed as "base37-qr-uri". Also, since all characters are URI unreserved, another alias for BASE37 may be "base37-qr-uri-unreserved".

There are certain rules for using the forward slash (/) and period (.) in URI paths. Although "." (period) is unreserved, anecdotal testing proves that it is not URI safe. The "." character cannot appear directly after the "/" character under special circumstances. The single "." character after a "I" in a URI path will instruct some browsers to discard the combined "/.", as the browser interprets this as "the current directory". The double "." character "..", carries a special meaning ("up a directory") if it appears after the "/" character. The browser will discard the last portion of the path before sending a request. Unfortunately, if the browser eliminates portions of URIs before requests are received by web applications, there is the potential for the loss of data.

For these reasons, "." and "/" are considered mutually exclusive in a URI. The period character "." is the last URI unreserved character yet to be added to an alphabet. However, anecdotal testing has shown that this designation is practically useless as it can carry special meaning for the browser. If the "." character is used for payloads representing numbers, by placing the "." in the zero's place, (the furthest right character), the "." character can be guaranteed to never immediately precede the "/" character as "." can only appear at the beginning of the string as a padding character.

Further, the forward slash "/" is not a URI unreserved character. Multiple forward slash characters (i.e. "//") appear to carry no special meaning on both Firefox and Chrome. Explicitly stated in RFC 3986 the "/" character sent to the application is interpreted by the browser. Multiple forward slashes in URI paths are explicitly valid in the RFC standard and no special handling needs to be considered for browser compatibility. Since "/" is preferred over ".", even though "/" is reserved while "." is unreserved, other less problematic reserved characters should precede "/".

BASE38-QR-URI-UNRESERVED: The BASE38-QR-URI-UNRESERVED character set is defined as the following:
0123456789ABCDEFGHIJKLMNOPQRSTUVWXYZ-.

The character set addition over the previously defined BASE37 character set is appended to the end of the BASE38-QR-URI-UNRESERVED character set. This base may also be referred to as "BASE38-QR-URI", and "base38-qr-uri". For simple QR applications that must use URI unreserved characters, the BASE38 character set may be preferred as long as payload data are longer than three characters.

The BASE38-QR-URI-UNRESERVED character set allows for 1,444 possibilities per character doublet (38*38=1,444). Each doublet minimally requires 11 bits to represent 1,444 combinations. The 1,444 possibilities over the alphanumeric potential of 2,025 represent a rounded efficiency of 71%. Adding two additional special characters for valid URI creation, "/" and ":", (40*40=1,600), a rounded efficiency of 79% of the available alphanumeric encoding space and 78% over the maximal bit encoding space (1600/2048).

BASE42: According to the RFC 3986, there are some URI reserved characters that should not be used in URIs except under certain circumstances. The reserved characters are the super set of two sub groups, so-called gen-delims and sub-delims. By ignoring guidelines for gen-delims, sub-delims, and percent encoding, further steps can be taken to make an alphanumeric encoding method for more efficient QR-URI encoding. The URI special delimiter characters, also known as reserved characters, which also appear in the QR are the following: 1) The gen-delim: ":", and 2) The sub-delims: "$", "*", and "+"

"$", "+", and "*" currently have no standard sub-delim function. "+" is commonly used in place of space but also has no rigidly defined usage. ":" also can be used in URI paths freely. Since gen-delims and sub-delims are permitted to be interpreted by the host in the path portion of the URI, these special characters can also be used to construct a base useful for arbitrary payload transmission. Adding these URI reserved characters allows the defining of the following BASE42 character set.

Additionally, the problematic "/" character is appended to the end of the alphabet. Adding these URI reserved characters allows the defining of the following BASE42 character set. The BASE42 character set is defined as the following:
0123456789ABCDEFGHIJKLMNOPQRSTUVW
XYZ-$+*:/

The character additions over the previously defined BASE37 alphabet are appended to the end of this new character set as they appear in the ASCII standard code table.

The BASE42 character set allows for 1849 possibilities per character doublet (42*42=1764). The number 1,764 over the potential of alphanumeric encoding space of 2,025 represents a rounded efficiency of 87%. Adding the special character "." for valid URI creation brings the total characters to 44. This is a rounded efficiency of 96% (43*43=1, 849; 1,849/2,025=~91%) of the available alphanumeric encoding space and ~90% over the bit encoding space. BASE42 encoder may also be referred to as "base42-qr-uri".

BASE45: In specific circumstances URI compatibility may be totally ignored, tightly controlled, or used with special applications. Without the concern of general URI compatibility, alphanumeric encoding is ideal to transmit binary data because QR code's alphanumeric encoding is more efficient than QR code's numeric or byte encoding. Alphanumeric encoding is the most efficient method of transmitting arbitrary binary data in QR codes and this can be accomplished by using a 45 character alphabet set.

In general, QR code also has the character percent "%" and space " ". These are the special characters that are neither URI reserved nor unreserved. The percent (%) is mentioned in the URI specification for use in percent encoding, and both space and percent are treated as reserved characters. The additional delimiter character "%" is used in URI percent encoding. Percent encoding is the character "%" followed by two hexadecimal digits representing that octet's numeric value in US-ASCII. For example, space is "% 20" and percent is "% 25". Space is not permitted in URIs and must be percent encoded.

Some browsers, such as Chrome and Firefox, automatically percent encode special characters in the URI. This can make it difficult for programs to decode URIs and interpret payloads. If "%" is not percent encoded itself (as "% 25"), hosts may have no way to distinguish percent encoded data from incorrectly percent encoded data without additional information, such as payload size. If special characters are not used in the URI, this is not a problem, as percent encoding can be ignored by the host. In order to allow truncation in case of problematic characters, the "%" character appears first in the alphabet before other special characters that may be percent encoded under special circumstances.

In the following BASE45 character set, there is a space before the "." character. The BASE45 character set is defined as the following:
0123456789ABCDEFGHIJKLMNOPQRSTUVWXYZ-$+*:/%.

The character additions over the previously defined BASE42 character set are appended to the end of this new character set as they appear in the ASCII code table. The BASE45 character set represents a 100% efficiency in the alphanumeric encoding space and 99% efficiency in the bit encoding space (2025/2048=~99%).

In an additional embodiment, a one character truncation of the BASE45 character set would result in a 44 character set which is about 96% efficient in the alphanumeric encoding space and 95% efficient in the bit encoding space. For pure binary transportation numeric encoding is ~98% efficient and is better suited if the space character must be excluded. However, if a user decides that alphanumeric encoding is best suited for their application, the user can simply omit the space character and use a base 44 subset. BASE45 may also be referred to as "base45-qr". Note it is not "qr-uri" as it is not an "uri" character set.

Base64: A standard base64 alphabet is a popular choice for binary transmission of data. The URI friendly 64 character encoding is possible using upper, lower, numeric, and a few special characters. A base64 alphabet is only 25% efficient in byte encoding space (64/256). Keeping in the spirit of the form with the previously mentioned alphanumeric alphabets, the Base64 character set can be formed. The Base64 character set may be defined as the following:
0123456789ABCDEFGHIJKLMNOPQRSTUVWXYZ-abcdefghijklmnopqrstuvwxyz-_

Unlike previous alphanumeric encoding methods, Base64's byte oriented character set is not a super set of the previously mentioned BASE45 character set. As such, "Base64" is not written in all uppercase like "BASE45" to signify that this is a byte oriented encoding set and is not limited to uppercase characters like BASE45.

This character set order follows the form of the previously defined BASE37, BASE38, BASE42, and BASE45, however the lowercase alphabet characters are inserted directly after the uppercase alphabet characters. Since the order of the alphabet is modified and it is no longer an extension over previously mentioned alphabet like BASE38, BASE42, and BASE45, the more URI friendly special characters "-" and "_" are chosen which are appended as they appear in the ASCII table. Base64 may also be referred to as "base64-uri", "base64-qr-uri", or "base64-qr-uri-unreserved".

The newly defined "Base64" is distinct from the well-known "base64" or "base64url". The standard base64 is defined in RFC 4880 and RFC 4648 as "Radix-64" or "base64" character set and as well as a unique encoding method. The newly defined Base64 character set and encoding method distinct from the industry-defined "base64". The Base64 alphanumeric encoding method is concerned with efficiency in the string character space and uses a generalized encoding method. The standard RFC "base64" is concerned with efficiency in the byte encoding space and uses a niche encoding method with a right pad. The RFC "base64" encoding is not easily generalizable to other methods. As an industry example, padding characters in the base64's character set are commonly omitted when padding is redundant for its usage.

Base66: Since byte encoding includes all URI unreserved characters, an alphanumeric encoding method can be constructed from the full 66 characters. The Base66 character set is defined as the following:
0123456789ABCDEFGHIJKLMNOPQRSTUVWXYZ-abcdefghijklmnopqrstuvwxyz-_.~

The extra characters over the previously defined Base64 are appended as they appear in the ASCII table. Within the URI unreserved character range, at maximum a 66 long character set can be constructed for a URI compatible payload. A 66 long character set represents a rounded 25.8% efficiency of the byte encoding space. If byte encoding is employed for QR encoding, the Base66 character set represents the most efficient encoding available and includes all URI unreserved characters. Base66 may also be referred to as "Base66-uri", or "base66-uri-unreserved".

Base183: According to ISO/IEC 8859-1 code table, byte encoding has a potential for 256 characters. 65 of the 256 potential characters are undefined leaving a remainder of 191 characters. Of these, an additional three characters, space, non-breaking space, and soft hyphen, are not printable. This brings the total printable characters down to 188. By considering the following 188 characters, the first 94 characters are from the 7 bit range, some of which are in the URI unreserved set, the next 94 printable characters are past the 7 bit range and do not appear in the URI unreserved character list. By concatenating the two ranges as they positionally appear in the ISO/IEC 8859-1 code table, the following character set may be formed:

!"#$%&'( )*+,./0123456789:;<=>?@ABCDEFGHIJKLM-NOPQRSTUVWXYZ[\]^_'abcdefghijklmnopqrst uvwxyz{|}~¡ £¤¥¦ §..©ª«¬®¯°±²³'
µ¶¦·¸ ¹º»¼½¾¿ÀÁÂÃÄÅÆÇÈÉÊËÌÍÎÏÐÑÒÓ ÔÕÖ×ØÙÚÛÜÝ þ ßàáâãäåæçèéêëìíîïðñòóôõö÷øùúûüý þ ÿ

There are a few problems with this character set for URIs. The "#" character is problematic since it is the "fragment" URI delimiter, making it difficult to work with URI parameters. For this reason "#" is excluded. As covered in the BASE38-QR-URI-UNRESERVED section, ".", "I" are mutually exclusive in a URI for arbitrary payloads, both are excluded. If "%" appears in some URIs, browsers like Firefox appear to percent encode any non-reserved URI character. The behavior is non-standard and varies among products and programming languages. For example the single quote character "'" and space character is automatically percent encoded by some browsers. For these reasons, "%" is excluded. This allows any percent encoded character to be interpretable in the URI. The "&" is also a delimiter for URI parameters, making it more difficult for applications to use. For this reason it is excluded.

The total exclusions for a URI-oriented payload are the following five characters:
%&/.

This leaves a 183 character set. A new alphabet can be formed extending the previously defined Base66 alphabet. The Base183 character set is defined as the following:
0123456789ABCDEFGHIJKLMNOPQRSTUVWXYZ-abcdefghijklmnopqrstuvwxyz-_~"$'(  )*+,:;<=>?@[\]^`{|}¡ £¤¥¦ §..©ª«¬®¯°±²³'
µ¶¦·¸ ¹º»¼½¾¿ÀÁÂÃÄÅÆÇÈÉÊËÌÍÎÏÐÑÒÓ ÔÕÖ×ØÙÚÛÜÝ þ ßàáâãäåæçèéêëìíîïðñòóôõö÷øùúûüý þ ÿ

Base191: Without the concern of URI encoding, the five previously excluded characters can be added again to construct a base188 alphabet. The excluded characters are added in their order of appearance in the ISO/IEC 8859-1 code table except for "." which appears last. Additionally, since this character set is designed for binary transmission, the three non-printable characters, space, non-breaking space, and soft hyphen are added to the end in order as they appear in the ISO/IEC 8859-1 code table. The three non-printable characters are listed as spaces here and in this document because of the technical constraints of the document. The new Base191 character set is defined as the following:
0123456789ABCDEFGHIJKLMNOPQRSTUVWXYZ-abcdefghijklmnopqrstuvwxyz-_~"$'(  )*+,:;<=>?@[\]^`{|}¡ £¤¥¦ §..©ª«¬®¯°±²³'
µ¶¦·¸ ¹º»¼½¾¿ÀÁÂÃÄÅÆÇÈÉÊËÌÍÎÏÐÑÒÓ ÔÕÖ×ØÙÚÛÜÝ þ ßàáâãäåæçèéêëìíîïðñòóôõö÷øùúûüý þ ÿ#%&/.

The Base191 character set represents a 74.6% efficiency in the bit encoding space (191/256). The Base191 may also be referred to as "base191".

The following table shows the integers $2^{256}$ represented in many bases (i.e., alphanumeric encoding methods:

TABLE 2

| Base | Payload Length | Representation |
|---|---|---|
| base 2 (Conventional) | 256 | 1111111111111111111111111111111111111111111111111111111111111111 1111111111111111111111111111111111111111111111111111111111111111 1111111111111111111111111111111111111111111111111111111111111111 1111111111111111111111111111111111111111111111111111111111111111 |
| base 10 (Conventional) | 78 | 115792089237316195423570985008687907853269984665640564039457584007913129639935 |
| base 16 (Conventional) | 64 | FFFFFFFFFFFFFFFFFFFFFFFFFFFFFFFFFFFFFFFFFFFFFFFFFFFFFFFFFFFFFFFF |
| BASE36 | 50 | 6DP5QCB22IM238NR3WVP0IC7Q99W035JMY2IW7I6N43D37JTOF |
| BASE37 | 50 | 1OOE3W1QDE9OHG2EHTL2Z93U9E36MI9-NX-K795RE4O1TBUL1F |
| BASE38-QR-URI-UNRESERVED | 49 | H5FC57TXAMG661DWK4J.YPC-Y70VMCWY52DC.DCKKD5PIOCWF |
| BASE42 | 48 | 5$-A6VHLSL4BJC3F$8LEJG0AC6HEJXLFMN04YXQ8KALZOO0F |
| BASE45 | 47 | AGZC8CGPPX3%8PW%LLZJ%MNSC+IGA7+SF E3HY.-ZA8OYLF |
| Base64 | 43 | F_____ |
| Base66-uri-unreserved | 43 | 4P~6VJBzcTCd02H9AKJnqDHS4WjhJYsw5GxKc5gmdo_ |
| Base183 | 35 | 1(ÝG"e+¹ú0−μ−dóÒo!ÚWõsT¨¥J» ©Ï¥cÕ7ÎL |
| Base191 | 34 | ªæ½ø]vÙOÙU/iÄNQ°hëhóCi tgäJ¿Ìs+üRE7 |

Figure 3:
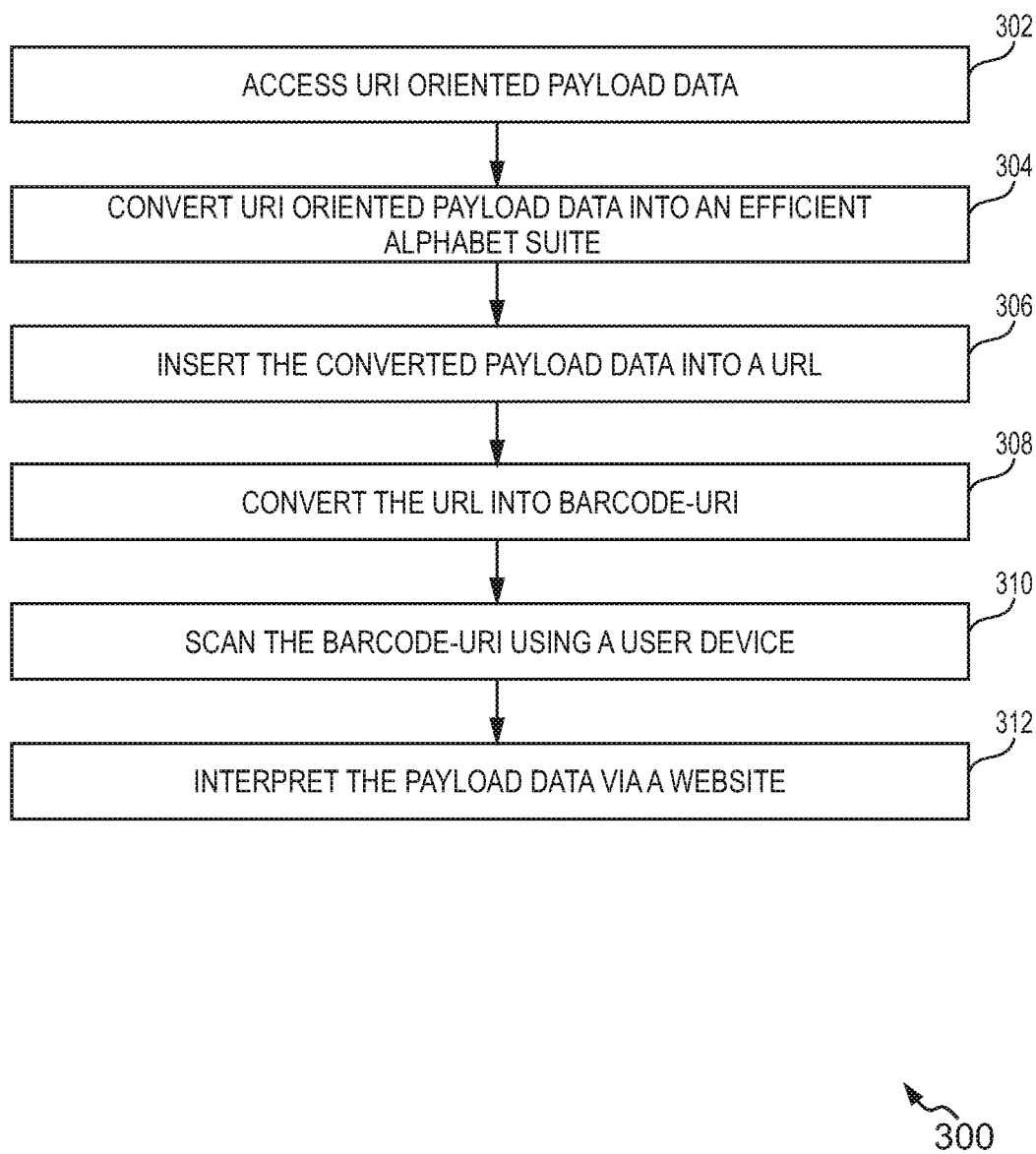
FIG. 3 is a flow diagram of a process for interpreting the URI-oriented payload data in a URI, in accordance with an embodiment of the present disclosure.

FIG. 3 is a flow diagram 300 of a process for interpreting the URI-oriented payload data in a URI, in accordance with an embodiment of the present disclosure.

At 302, the server system 102 accesses URI-oriented payload data including actionable payload data from the database or the user 108. The URI-oriented payload data may include the unique URL for exposure via a machine scannable code to a plurality of user devices. In one example, the URI-oriented payload data may include text associated with website that may be required to direct any device to enter the website. The payload data to be incorporated may in a barcode-URI may include web address, path, and the like. In another example, the URI-oriented data represented in form of strings is used to transfer data in many computer systems. The strings can be anything, from simple digits (01), models (Model z2010), SKU's (k596789), and serial numbers, (5976-7894-8978). The information in such strings can be expressed in terms of bits. For example, crypto-currency network (e.g., "Ethereum") uses a 160 bit string representing information in hexadecimal encoding, plus the characters "0x" for its address in hex, giving a string of 42 characters ((160/4)+2=42 characters).

At 304, the server system 102 converts the URI-oriented payload data into an alphanumeric data type based at least on an alphanumeric encoding method from a plurality of alphanumeric encoding methods. The alphanumeric data type may include a set of characters according to the alphanumeric encoding method. The server system 102 may use a predetermined alphanumeric encoding method or custom alphanumeric encoding methods and selects one of them implicitly or explicitly. The plurality of alphanumeric encoding methods may include BASE36, BASE37, BASE38-QR-URI-UNRESERVED, BASE42, BASE45, Base64, Base66, Base183, and Base191. In one embodiment, the server system 102 may receive character set or character sets associated with the alphanumeric encoding method that is utilized for encoding the URI-oriented payload data.

In one example, the server system 102 may receive indication about the character set of an alphanumeric encoding method along with the URI-oriented payload data (for example, the URI string can be represented as: cyphr.me/c/ABCD?chars=0123456789ABCDEFGHIJKLMNOPQRSTUVWXYZ-). In another example, the URI string may include indicator (e.g. "?BASE=37") associated with the alphanumeric encoding method and based conversion method.

The alphanumeric data type (i.e., encoded string) may then be inserted into a URL or as binary information in a barcode or QR code. The conversion of the URI-oriented payload data may result in converted payload data. In an example, the converted payload data may look like the following:
"1OOE3W1QDE9OHG2EHTL2Z93U9E36MI9-NX-K795RE4O1TBUL1F"

The alphanumeric data type may be converted using BASE37 encoding method described with respect to FIG. 2 in detail. The character set used to convert the URI-oriented payload data may be '0123456789ABCDEFGHIJKLM-NOPQRSTUVWXYZ-'.

At 306, the server system 102 inserts the converted payload data into a URL. In the example the converted payload data provided above may be inserted into a URL as follows:
"HTTPS://CYPHR.ME/C/
1OOE3W1QDE9OHG2EHTL2Z93U9E36MI9-NX-K795RE4O1TBUL1F"

Here, "/C" denotes a path parameter signifying the encoding the payload data. The server system 102 may pass the URL inserted with the converted payload data to the URI management system 106 as described in FIG. 1. An URL will be shown.

At 308, the URI management system 106 converts the URL into a barcode-URI or QR-URI. The URI management system 106 is configured to generate machine readable code which may be a QR code, Maxi code, data matrix, PDF 417, Aztec code, code 128, and the like.

Once the barcode-URI or the QR-URI is generated, any device may scan the same and access the URL. In an example, at 310, the user device 110 scans the machine readable code. The user device 110 may include a camera capable of scanning the machine readable code. A web application may also be installed on the user device 110.

The web application may be capable of reading the data encoded in the scanned barcode-URI and interpret the data. At 312, the user device 110 interprets the URI-oriented payload data via the web application (website). The interpreted payload data may then be used to access the URL incorporated in the barcode-URI or the QR-URI.

Figure 4:
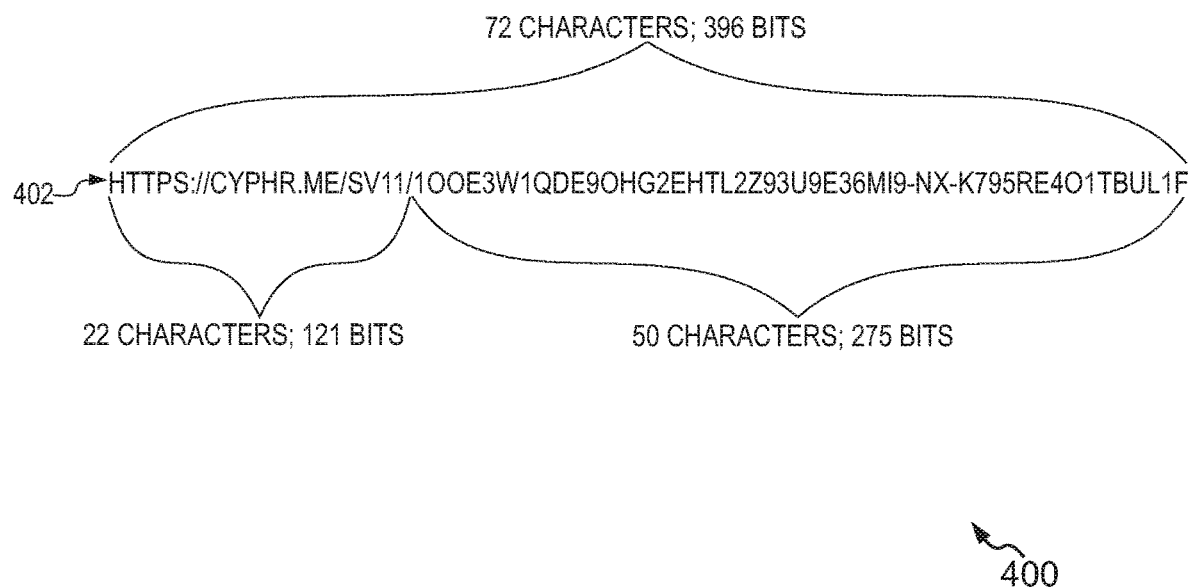
FIG. 4 is an exemplary illustration of QR alphanumeric code encoded URI that is encoded using BASE37 alphanumeric encoding method, in accordance with an embodiment of the present disclosure.

FIG. 4 is an exemplary illustration 400 of a QR alphanumeric code encoded URI that is encoded using BASE37 alphanumeric encoding method, in accordance with an embodiment of the present disclosure. An alphanumeric URI (see, 402) with an arbitrary 256 bit payload is provided as an example. The alphanumeric URI with 256 bit payload may look like the following:
"HTTPS://CYPHR.ME/SV11/
1OOE3W1QDE9OHG2EHTL2Z93U9E36MI9-NX-K795RE4O1TBUL1F"

The alphanumeric URI has 72 characters. The first URI section may be as follows: "HTTPS://CYPHR.ME/SV11/". The first URI section including the last slash is 22 characters (121 bits). The payload is 256 bits, but takes 275 bits of space as encoded. The payload is BASE37 encoded and 50 characters long. In total, the whole URI uses 396 bits as shown in the figure.

On the other hand, the byte-encoded URI with a Base64 payload has 65 characters. The first URI section including the last slash is 22 characters (168 bits). The payload is 256 bits, but takes 344 bits of space as encoded. The payload is Base64 encoded and 43 characters long. In total, it uses 520 bits.

Additionally, the QR alphanumeric encoding method minimally needs version 3 (29×29), which has a character length range from 48 to 77. By keeping the alphanumeric URI shorter than 77 characters, QR "version 3", the third to smallest code can be employed. Byte encoding minimally needs version 4 (33×33), which ranges from 54 to 78 characters. In QR terms, QR alphanumeric encoding clearly needs less space as version 3 is 22.7% smaller than version 4.

Therefore, it can be clearly seen that the QR alphanumeric code encoded with BASE37 payload is a more efficient way of encoding when compared to the existing byte encoding methods.

Figure 5:
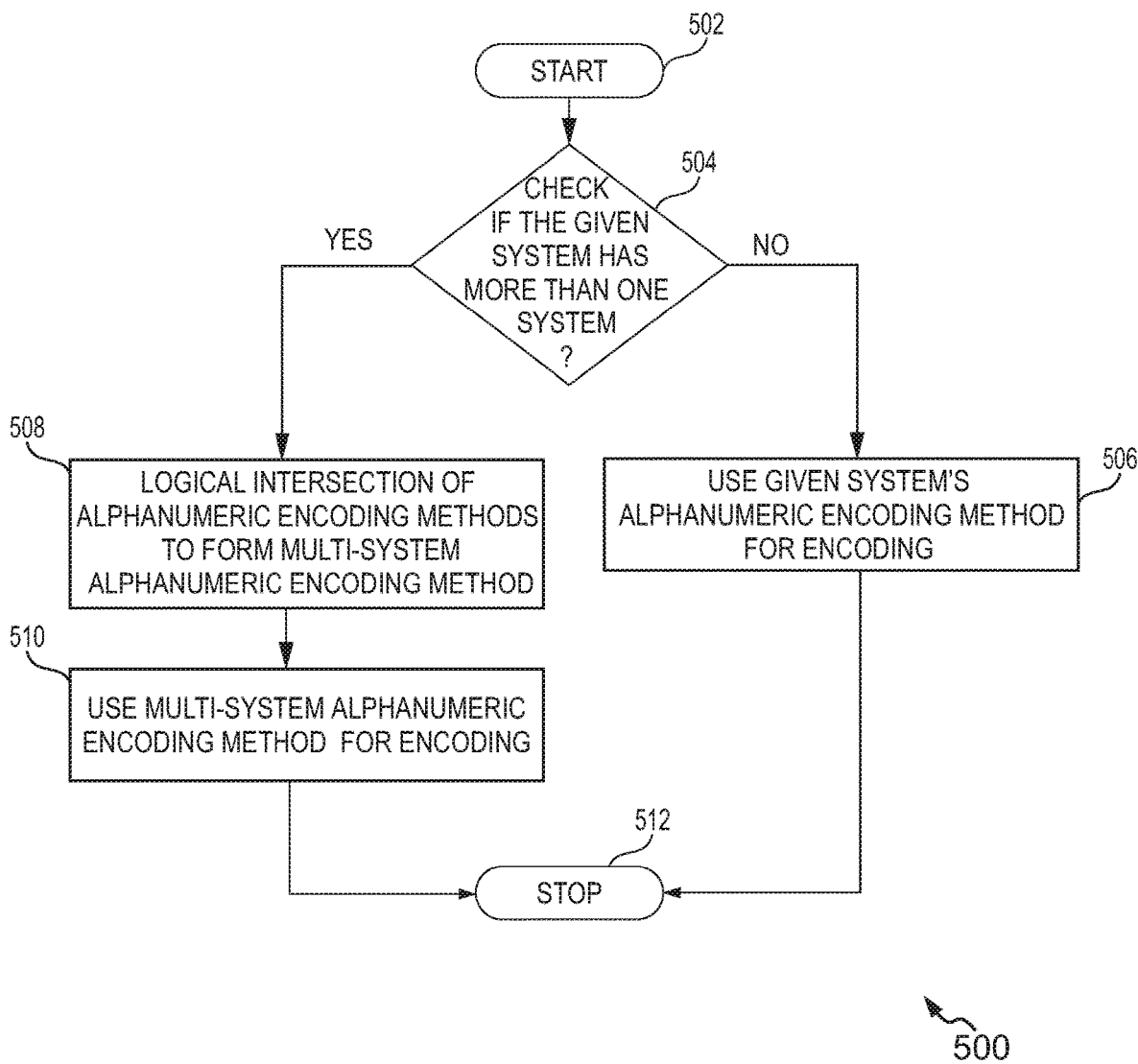
FIG. 5 is a flow diagram representation of a process for determining a multi-system alphabet suite for a given system, in accordance with an embodiment of the present disclosure.

FIG. 5 is a flow diagram representation 500 of a process for determining a multi-system alphanumeric encoding method compatible to one or more systems, in accordance with an embodiment of the present disclosure. The process may be performed by the server system 102. The process starts at 502. At 504, the server system 102 checks if the given system has more than one systems in it. If it is determined that more than one systems are not present in the given system, the server system 102 utilizes the given system's alphanumeric encoding, at 506. The process may stop at 512 after the encoding is performed. At 508, in an alternate embodiment, if it is determined that more than one systems are present in the given system, the server system 102 performs logical intersection of the alphanumeric encoding to form a multi-system alphanumeric encoding. At 510, the server system 102 uses multi-system alphanumeric encoding for performing the encoding. The process stops at 512 after the encoding is performed.

For example, if one system is compatible with the byte alphabet (256), and the other is compatible with the QR alphanumeric alphabet (45), then BASE45 would be the most efficient alphabet that meets minimum system requirements. If adding the requirement of URI usability, then BASE42 would be the most efficient. If adding the requirement of URI-unreserved characters, then BASE37 is the most efficient alphabet that meets minimum system requirements.

Figure 6:
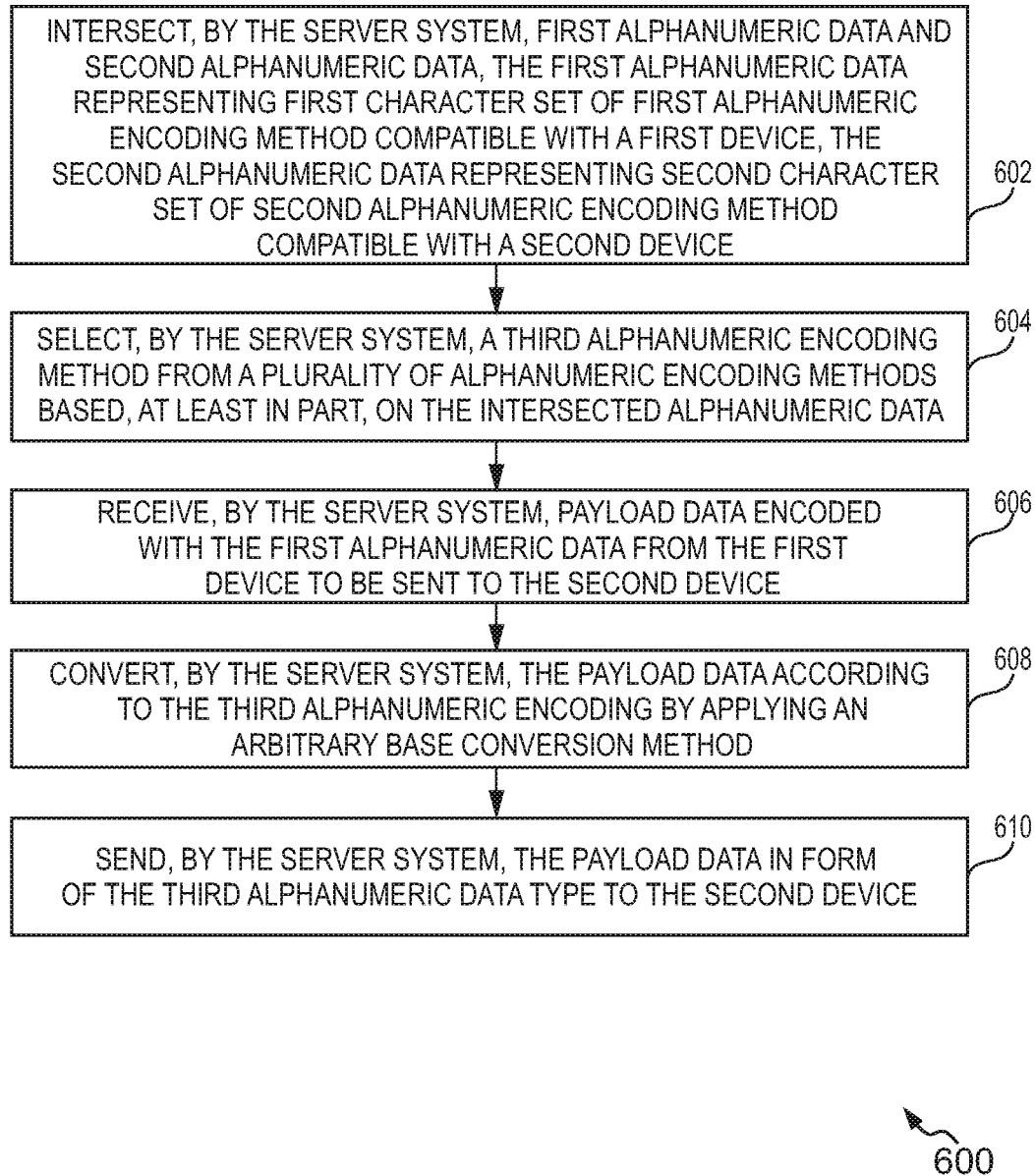
FIG. 6 is a flow diagram a process flow for determining multi-system alphanumeric data by applying arbitrary base conversion, in accordance with an embodiment of the present disclosure.

FIG. 6 is a flow diagram 600 of a process flow for determining multi-system alphanumeric data by applying one or more arbitrary base conversion methods, in accordance with an embodiment of the present disclosure. The process 600 depicted in the flow diagram may be executed by the server system 102 which may be standalone server or a server as whole incorporated in another server system. Operations of the method 600, and combinations of operation in the method 600, may be implemented by, for example, hardware, firmware, a processor, circuitry and/or a different device associated with the execution of software that includes one or more computer program instructions.

At 602, the server system 102 accesses encoding requirements (i.e., device-specific encoding parameters) of a first device and a second device. The device-specific encoding parameters may indicate that the first device is compatible with first alphanumeric encoding method and the second device is compatible with second alphanumeric encoding method At 604, the server system 102 intersects first alphanumeric data and second alphanumeric data. The first alphanumeric data represents first character set of the first alphanumeric encoding method compatible with the first device and the second alphanumeric data represents second character set of the second alphanumeric encoding method compatible with the second device. The intersection is a process where two or more character sets (alphanumeric data) compatible with multiple devices are combined based on the need for interoperability. Intersection may be similar to the intersection of sets where common in both the sets are retained and other characters are taken out.

In an example, the first alphanumeric data of the first alphanumeric encoding method compatible with the first device may be as follows:
0123456789ABCDEFGHIJKLMNOPQRSTUVWXYZ–?

The second alphanumeric data of the second alphanumeric encoding method compatible with the second device may be as follows:
0123456789ABCDEFGHIJKLMNOPQRSTU VWXYZ–$+*:/%.

As it can be seen, the first alphanumeric data is compatible with base 38 character set with upper case alphabet, numeric data and the special characters "–", and "T'. The second alphanumeric data is compatible with BASE45 character set. In the example the intersection of these two character sets may result in the following:
0123456789ABCDEFGHIJKLMNOPQRSTUVWXYZ–

At 606, the server system 102 selects a third alphanumeric encoding method from a plurality of alphanumeric encoding methods based, at least in part, on the intersected alphanumeric data. In particular, the server system 102 is configured to select a suitable alphanumeric encoding method from the plurality of alphanumeric encoding methods. The selection process is performed based on a compatible encoding format from the plurality of alphanumeric encoding methods. A third alphanumeric encoding method may be selected by the server system 102 based on a matching of the third alphanumeric data and the alphanumeric data obtained from the intersection process.

In the example, the character set obtained from the intersection matches with the character set of the BASE37 encoding method described in detail previously. Therefore, the server system 102 selects the BASE37 alphanumeric encoding for encoding the alphanumeric data.

At 608, the server system 102 receives payload data encoded with the first alphanumeric data from the first device to be sent to the second device.

At 610, the server system 102 converts the payload data according to the third alphanumeric encoding by applying one or more arbitrary base conversion methods.

In particular, the server system 102 is configured to receive the input from the first device that will be converted to the third alphanumeric data type determined based on the selection process. In the example, the input from the user device 110 may be converted to alphanumeric data that is compatible with BASE37 encoding format.

At 612, the server system 102 sends the payload data in form of the third alphanumeric data type to the second device. In the example, the server system 102 sends the URI-oriented payload data received from the user device 110, in the form of BASE37 encoding format to the second device.

Figure 7:
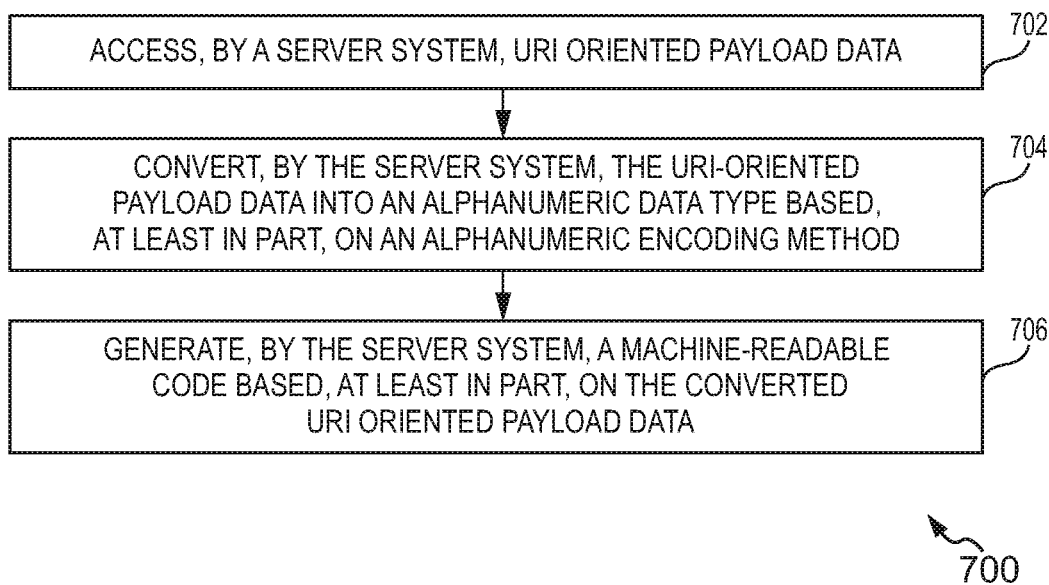
FIG. 7 is a flow diagram of a computer-implemented method for efficient alphanumeric encoding for URIs, in accordance with an embodiment of the present disclosure.

FIG. 7 is a flow diagram of a computer-implemented method 700 for efficient alphanumeric encoding for URIs, in accordance with an embodiment of the present disclosure. The method 700 depicted in the flow diagram may be executed by the server system 102 which may be standalone server or a server as whole incorporated in another server system. Operations of the method 700, and combinations of operation in the method 700, may be implemented by, for example, hardware, firmware, a processor, circuitry and/or a different device associated with the execution of software that includes one or more computer program instructions.

At 702, the method 700 includes accessing URI-oriented payload data from a user device. The URI-oriented payload data may include data associated with a product or a website. The URI-oriented payload data may be accessed from a database associated with a client side server.

At 704, the method 700 includes converting the URI-oriented payload data into an alphanumeric data type based, at least in part, on an alphanumeric encoding method from a plurality of alphanumeric encoding methods. The alphanumeric encoding methods may include BASE36, BASE37, BASE38-QR-URI-UNRESERVED, BASE42, BASE45, Base64, Base66, Base183, and Base19. In one embodiment, the converting URI-oriented payload data is performed using an iterative divide by radix method.

In one embodiment, the method 700 includes truncating a character set corresponding to a candidate alphanumeric encoding method selected from the plurality alphanumeric encoding methods to obtain or determine the alphanumeric encoding method with higher compatibility across systems.

In another embodiment, the method 700 includes extending a character set corresponding to a candidate alphanumeric encoding method selected from the plurality alphanumeric encoding methods to obtain or determine the alphanumeric encoding method with higher efficiency. The extension process may include following steps: (a) Intersect: Given two character sets associated with two alphanumeric encoding methods, intersect the first character set from the second character set. Keep any remainders from the intersection, (b) Append Second Remainders: Insert the intersect characters and append second remainder characters, (c) Append First Remainders: If the first character set is not the subset of the second character set, the first character set will have remainder characters. Insert the first character set reminder characters to the character set from step two. The resulting character set is the extended character set.

At 706, the method 700 includes generating a machine-readable code based, at least in part, on the converted URI-oriented payload data. The machine-readable code maybe in the form of: QR-URI, URI, QR code, barcode, and the like.

Figure 8:
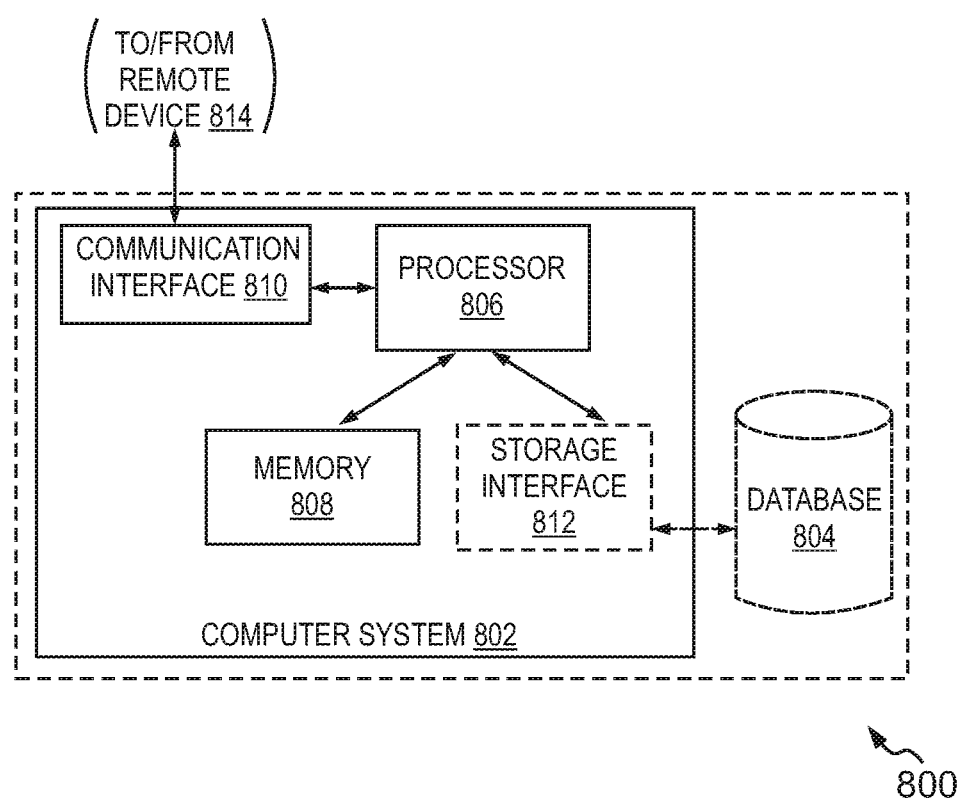
FIG. 8 is a simplified block diagram of a server system, in accordance with an embodiment of the present disclosure.

FIG. 8 is a simplified block diagram of a server system 800, in accordance with an embodiment of the present disclosure. The server system 800 includes a computer system 802 and a database 804. In an embodiment, the server system 800 is integrated, but not limited to, in the server system 102 or in the URI management system 106 (referring to FIG. 1).

The computer system 802 includes at least one processor 806 configured to execute executable instructions for providing various features of the present disclosure. The executing instructions are stored in a memory 808. The components of the computer system 802 provided herein may not be exhaustive and that the computer system 802 may include more or fewer components than those depicted in FIG. 8. Further, two or more components may be embodied in one single component, and/or one component may be configured using multiple sub-components to achieve the desired functionalities. Some components of the computer system 802 may be configured using hardware elements, software elements, firmware elements and/or a combination thereof.

The processor 806 is operatively coupled to a communication interface 810 such that the computer system 802 is capable of communicating with a remote device 814 such as the user device 110, or the URI management system 106 or communicate with any entity connected to the network 116 (shown in FIG. 1) or any constituents of the server system 102. In an embodiment, the processor 806 may be capable of accessing the URI-oriented payload data from the database 804. The processor 806 may further convert the URI-oriented payload data by utilizing at least one of a plurality of alphanumeric encoding methods. The processor 806 is further configured to generate machine-readable code based on the converted URI-oriented payload data.

In some embodiments, the database 804 is integrated within computer system 802. For example, the computer system 802 may include one or more hard disk drives as the database 804. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 806 with access to the database 804.

Figure 9:
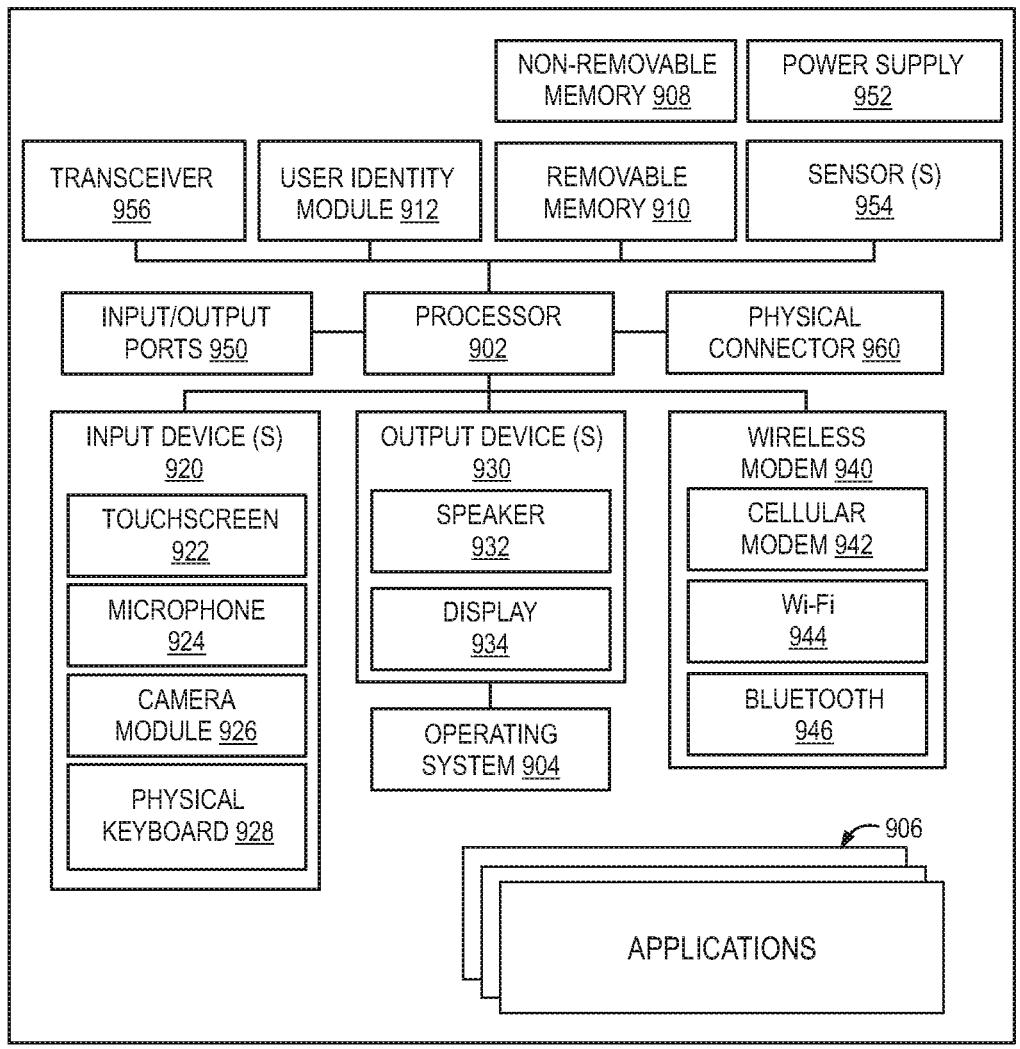
FIG. 9 is a simplified block diagram of an electronic device capable of implementing the various embodiments of the present disclosure.

FIG. 9 is a simplified block diagram of an electronic device 900 capable of implementing the various embodiments of the present disclosure. The electronic device 900 may be an example of the one of the user device 110 shown in FIG. 1. It should be understood that the electronic device 900 as illustrated and hereinafter described is merely illustrative of one type of device and should not be taken to limit the scope of the embodiments. As such, it should be appreciated that at least some of the components described below in connection with the electronic device 900 may be optional and thus in an example embodiment may include more, less, or different components than those described in connection with the example embodiment of the FIG. 9. As such, among other examples, the electronic device 900 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the electronic device 900 and provides support for one or more programs such as scanning a QR-URI and interpreting the payload data encoded in the QR-URI. The electronic device 900 is depicted to include one or more applications such as applications 906 facilitated by the server system 102. The applications 906 can be an instance of an application downloaded from the server system 102 or a third-party server. The applications 906 are capable of communicating with the server system 102 for facilitating interpreting of the payload data encoded in the QR-URI of a website or a product. The applications may include common computing applications (e.g., telephony applications, email applications, calendars, contact managers, web browsers, messaging applications such as USSD messaging or SMS messaging or SIM Tool Kit (STK) application) or any other computing application.

The illustrated electronic device 900 includes one or more memory components, for example, a non-removable memory 908 and/or a removable memory 910. The non-removable memory 908 and/or the removable memory 910 may be collectively known as storage device/module in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904. The electronic device 900 may further include a user identity module (UIM) 912. The UIM 912 may be a memory device having a processor built-in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the electronic device 900 and a public switched telephone network (PSTN).

The electronic device 900 can further include one or more input/output ports 950, a power supply 952, one or more sensors 954 for example, an accelerometer, a gyroscope, a compass, a global positioning system sensor (for providing location details) or an infrared proximity sensor for detecting the orientation or motion of the electronic device 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 102 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A computer-implemented method, comprising:
    accessing, by a server system, URI-oriented payload data, wherein the URI-oriented payload data includes text data used to uniquely identify a product or a website that is encoded in the URI;

converting, by the server system, the URI-oriented payload data into an alphanumeric data type based, at least in part, on an alphanumeric encoding method selected from a plurality of alphanumeric encoding methods, wherein the plurality of alphanumeric encoding methods include BASE36, BASE37, BASE38-QR-URI-UNRESERVED, BASE42, BASE45, Base64, Base66, Base183, and Base19;

generating, by the server system, a machine-readable code based, at least in part, on the converted URI-oriented payload data using an URI management system for the generation of the machine-readable code;

providing, by the server system, an application to install on the user device for scanning the machine-readable code by the user device;

interpreting, by the server system, the payload data encoded in the URI scanned by the user device;

defining, by the server system, intersection between barcode encoding and URI encoding;

intersecting, by the server system, a first alphanumeric data and a second alphanumeric data, wherein the intersection is a process where two or more character sets compatible with multiple devices are combined based on the need for interoperability; and selecting, by the server system a third alphanumeric encoding method based on a matching of the third alphanumeric data and the alphanumeric data obtained from the intersection process.

2. The computer-implemented method as claimed in claim 1, wherein the alphanumeric encoding method is one of: BASE36, BASE37, BASE38-QR-URI-UNRESERVED, BASE42, BASE45, Base64, Base66, Base183, and Base191.

3. The computer-implemented method as claimed in claim 2, wherein each alphanumeric encoding method comprises a data structure representing a character set.

4. The computer-implemented method as claimed in claim 3, wherein the character set comprises a combination of alphabet, numerical data, and special characters.

5. The computer-implemented method as claimed in claim 1, further comprising truncating, by the server system, a character set corresponding to a candidate alphanumeric encoding method selected from a plurality alphanumeric encoding methods to obtain the alphanumeric encoding method with higher compatibility.

6. The computer-implemented method as claimed in claim 1, further comprising extending, by the server system, a character set corresponding to a candidate alphanumeric encoding method selected from a plurality alphanumeric encoding methods to obtain the alphanumeric encoding method with higher efficiency.

7. The computer-implemented method as claimed in claim 1, further comprising:

accessing, by the server system, device-specific encoding parameters of a first device and a second device;

intersecting, by the server system, the first alphanumeric data and the second alphanumeric data, the first alphanumeric data representing first character set of first alphanumeric encoding method compatible with the first device, the second alphanumeric data representing second character set of second alphanumeric encoding method compatible with the second device;

selecting, by the server system, the third alphanumeric encoding method from a plurality of alphanumeric encoding methods based, at least in part, on the intersected alphanumeric data;

receiving, by the server system, payload data encoded with the first alphanumeric data from the first device to be sent to the second device;

converting, by the server system, the payload data according to the third alphanumeric encoding by applying an arbitrary base conversion method; and sending, by the server system, the payload data in form of the third alphanumeric data type to the second device.

8. A server system, comprising:
a communication interface;
a memory comprising executable instructions; and
a processor communicably coupled to the communication interface, the processor configured to execute the executable instructions to cause the server system to at least access URI-oriented payload data, wherein the URI-oriented payload data includes text data used to uniquely identify a product or a website that is encoded in the URI, convert the URI-oriented payload data into an alphanumeric data type based, at least in part, on an alphanumeric encoding method selected from a plurality of alphanumeric encoding methods, wherein the plurality of alphanumeric encoding methods include BASE36, BASE37, BASE38-QR-URI-UNRESERVED, BASE42, BASE45, Base64, Base66, Base183, and Base19, generate a machine-readable code based, at least in part, on the converted URI oriented payload data using an URI management system for the generation of the machine-readable code, provide an application to install on the user device for scanning the machine-readable code by the user device, interpret the payload data encoded in the URI scanned by the user device;

define intersection between barcode encoding and URI encoding;

intersect a first alphanumeric data and a second alphanumeric data, wherein the intersection is a process where two or more character sets compatible with multiple devices are combined based on the need for interoperability; and select a third alphanumeric encoding method based on a matching of the third alphanumeric data and the alphanumeric data obtained from the intersection process.

9. The server system as claimed in claim 8, wherein the alphanumeric encoding method is one of: BASE36, BASE37, BASE38-QR-URI-UNRESERVED, BASE42, BASE45, Base64, Base66, Base183, and Base191.

10. The server system as claimed in claim 9, wherein each alphanumeric encoding method comprises a data structure representing a character set.

11. The server system as claimed in claim 8, wherein the character set comprises a combination of alphabet, numerical data, and special characters.

12. The server system as claimed in claim 8, wherein the server system is further caused to truncate a character set corresponding to a candidate alphanumeric encoding method selected from the plurality alphanumeric encoding methods to obtain the alphanumeric encoding method with higher compatibility.

13. The server system as claimed in claim 8, wherein the server system is further caused to extend a character set corresponding to a candidate alphanumeric encoding method selected from a plurality alphanumeric encoding methods to obtain the alphanumeric encoding method with higher efficiency.

14. A computer-implemented method for efficient alphanumeric encoding of URIs, the computer-implemented method comprising:
   accessing, by a server system, URI-oriented payload data, wherein the URI-oriented payload data includes text data used to uniquely identify a product or a website that is encoded in the URI;
   converting, by the server system, the URI-oriented payload data into an alphanumeric data type based, at least in part, on an alphanumeric encoding method selected from a plurality of alphanumeric encoding methods, wherein the plurality of alphanumeric encoding methods comprises BASE36, BASE37, BASE38-QR-URI-UNRESERVED, BASE42, BASE45, Base64, Base66, Base183, and Base191;
   generating, by the server system, a machine-readable code based, at least in part, on the converted URI-oriented payload data, using an URI management system for the generation of the machine-readable code;
   providing, by the server system, an application to install on the user device for scanning the machine-readable code by the user device;
   interpreting, by the server system, the payload data encoded in the URI scanned by the user device;
   defining, by the server system, intersection between barcode encoding and URI encoding;
   intersecting, by the server system, a first alphanumeric data and a second alphanumeric data, wherein the intersection is a process where two or more character sets compatible with multiple devices are combined based on the need for interoperability; and
   selecting, by the server system a third alphanumeric encoding method based on a matching of the third alphanumeric data and the alphanumeric data obtained from the intersection process.

15. The computer-implemented method as claimed in claim 14, wherein each alphanumeric encoding method of the plurality of alphanumeric encoding methods comprises a data structure representing a character set.

16. The computer-implemented method as claimed in claim 15, wherein the character set comprises a combination of alphabet, numerical data, and special characters.

17. The computer-implemented method as claimed in claim 14, further comprising truncating a character set corresponding to a candidate alphanumeric encoding method selected from the plurality alphanumeric encoding methods to obtain the alphanumeric encoding method with higher compatibility across systems.

18. The computer-implemented method as claimed in claim 14, further comprising extending a character set corresponding to a candidate alphanumeric encoding method selected from the plurality alphanumeric encoding methods to obtain the alphanumeric encoding method with higher efficiency.

19. The computer-implemented method as claimed in claim 14, further comprising:
   accessing, by the server system, device-specific encoding parameters of a first device and a second device;
   intersecting, by the server system, first alphanumeric data and second alphanumeric data, the first alphanumeric data representing first character set of first alphanumeric encoding method compatible with the first device, the second alphanumeric data representing second character set of second alphanumeric encoding method compatible with the second device;
   selecting, by the server system, a third alphanumeric encoding method from a plurality of alphanumeric encoding methods based, at least in part, on the intersected alphanumeric data;
   receiving, by the server system, payload data encoded with the first alphanumeric data from the first device to be sent to the second device;
   converting, by the server system, the payload data according to the third alphanumeric encoding by applying an arbitrary base conversion method; and
   sending, by the server system, the payload data in form of the third alphanumeric data type to the second device.

20. The computer-implemented method as claimed in claim 14, wherein the arbitrary base conversion method is iterative divide by radix.

\* \* \* \* \*